(«12») United States Patent
Shimizu et al.

(10) Patent No.: US 10,897,959 B2
(45) Date of Patent: Jan. 26, 2021

(54) OUTSOLE AND SHOE

(71) Applicant: Asics Corporation, Kobe (JP)

(72) Inventors: Yuto Shimizu, Kobe (JP); Naoto Iwashita, Kobe (JP)

(73) Assignee: ASICS CORPORATION

( * ) Notice: Subject to any disclaimer, the term of this patent is extended or adjusted under 35 U.S.C. 154(b) by 57 days.

(21) Appl. No.: 16/325,547

(22) PCT Filed: Aug. 16, 2016

(86) PCT No.: PCT/JP2016/073918
§ 371 (c)(1),
(2) Date: Feb. 14, 2019

(87) PCT Pub. No.: WO2018/033962
PCT Pub. Date: Feb. 22, 2018

(65) Prior Publication Data
US 2019/0208861 A1 Jul. 11, 2019

(51) Int. Cl.
| | | |
|---|---|---|
| *C08L 9/00* | (2006.01) |
| *A43B 13/18* | (2006.01) |
| *A43B 13/04* | (2006.01) |
| *C08L 101/00* | (2006.01) |
| *C08L 7/00* | (2006.01) |
| *A43B 13/12* | (2006.01) |

(52) U.S. Cl.
CPC ............ *A43B 13/187* (2013.01); *A43B 13/04* (2013.01); *A43B 13/12* (2013.01); *C08L 7/00* (2013.01); *C08L 9/00* (2013.01); *C08L 101/00* (2013.01)

(58) Field of Classification Search
CPC .. C08L 9/00; C08L 101/00; C08L 7/00; C08L 53/02; C08L 23/0815; A43B 13/187; A43B 13/12; A43B 13/04; C08K 5/14; C08K 3/06
See application file for complete search history.

(56) References Cited

U.S. PATENT DOCUMENTS

| | | |
|---|---|---|
| 2009/0239965 A1 | 9/2009 | Wada et al. |
| 2010/0029827 A1 | 2/2010 | Ansems et al. |
| 2010/0154253 A1 | 6/2010 | Imazato et al. |
| 2011/0118404 A1* | 5/2011 | Jung et al. ............... C08L 7/00 524/526 |
| 2013/0096259 A1 | 4/2013 | Bette |
| 2015/0181975 A1 | 7/2015 | Otsuka et al. |
| 2016/0113353 A1 | 4/2016 | Tateishi |

FOREIGN PATENT DOCUMENTS

| | | |
|---|---|---|
| CN | 101605825 A | 12/2009 |
| CN | 102959013 A | 3/2013 |
| EP | 2 045 287 A1 | 4/2009 |
| EP | 2 588 534 | 5/2013 |
| EP | 3 178 340 A1 | 6/2017 |
| JP | 5756893 B | 6/2010 |
| JP | 4964952 B | 8/2010 |
| JP | 2013-530286 A | 7/2013 |
| JP | 2014-218554 A | 11/2014 |
| JP | 5749358 B | 5/2015 |
| JP | 2016-027929 A | 2/2016 |
| KR | 10-2013-0114608 A | 10/2013 |
| KR | 101506651 B1 | 3/2015 |
| SG | 186719 A1 | 2/2013 |
| WO | 2012/000877 A1 | 1/2012 |
| WO | 2016/021023 A | 2/2016 |

OTHER PUBLICATIONS

Extended European Search Report for European Patent Application No. 16913491 dated May 31, 2019.
International Search Report for International Application No. PCT/JP2016/073918 dated Nov. 15, 2016.
Chinese Office Action dated Jul. 28, 2020, from Chinese Patent Application No. 201680088416.0, 7 sheets.

* cited by examiner

*Primary Examiner* — Nathan M Nutter
(74) *Attorney, Agent, or Firm* — Katten Muchin Rosenman LLP (57) ABSTRACT

Provided in the present invention is an outsole formed of a polymer crosslinked product having a JIS A hardness of 90 or less and a tear strength of 40 kgf/cm or more and having a certain relationship between a storage modulus ($E_{23}$) at 23° C. and 10 Hz and a storage modulus ($E_{160}$) at 160° C. and 10 Hz, to reduce the weight of a shoe.

7 Claims, 4 Drawing Sheets

OUTSOLE AND SHOE

FIELD

The present invention relates to an outsole and a shoe including the outsole.

BACKGROUND

Shoes such as sports shoes conventionally are composed of many members.

For example, a sole is composed of such members as an inner sole, a sock liner, a midsole and an outsole.

Among these, the outsole needs to be not only highly strong but also moderately soft.

As shown in Patent Literature 1 below, a conventional outsole is formed of a crosslinked product of rubber.

The crosslinked product contains an inorganic filler such as silica to allow the outsole to exert its required properties.

CITATION LIST

Patent Literature

Patent Literature 1: JP 2014-218554 A

SUMMARY

Technical Problem

It is demanded that shoes such as sports shoes be lightweight.

The mass of an outsole accounts for a comparatively high proportion of the total mass of a shoe.

Therefore, reducing the weight of the outsole is effective for reducing the weight of the shoe.

However, a low density polymer crosslinked product suitable for forming the outsole has never been found, and it is difficult to satisfy the above demand.

Thus, an object of the present invention is to provide an outsole excellent in lightweight property to reduce the weight of the shoe.

Solution to Problem

As a result of diligent studies to solve the abovementioned problem, the present inventors have found that a reinforcing effect is exerted on a rubber by blending a thermoplastic resin in the rubber.

The present inventors have further found that a polymer crosslinked product including a rubber and a thermoplastic resin is formed to have a certain relationship between a storage modulus at an ordinary temperature and a storage modulus at a high temperature so that the properties suitable for the outsole can be exerted on the polymer crosslinked product, thereby completing the present invention.

The outsole of the present invention is an outsole formed of a polymer crosslinked product, wherein the polymer crosslinked product includes a rubber and a thermoplastic resin, has a JIS A hardness of 90 or less and a tear strength of 40 kgf/cm or more, and has a relationship shown by the expression (1) below between a storage modulus ($E_{23}$) at 23° C. and 10 Hz and a storage modulus ($E_{160}$) at 160° C. and 10 Hz:

$$3 \leq [(E_{23})/(E_{160})] \leq 40 \tag{1}$$

The shoe of the present invention for solving the abovementioned problem includes the outsole as above.

DESCRIPTION OF EMBODIMENTS

The present invention will be hereinafter described by way of embodiments.

Figure 1:
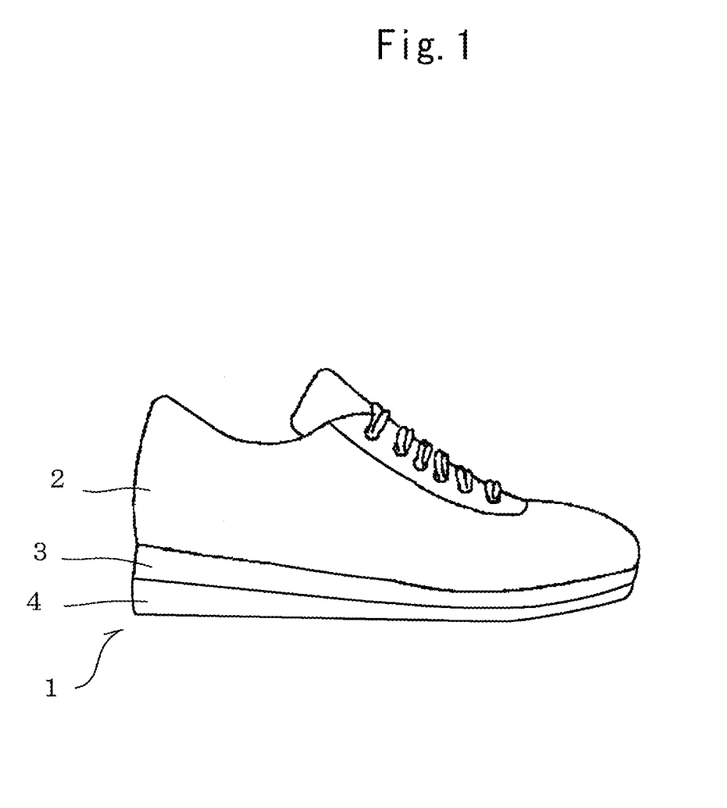
FIG. 1 is a schematic side view showing one aspect of a shoe including an outsole.

As shown in FIG. 1, a shoe 1 of this embodiment has an upper material 2, a midsole 3, and an outsole 4.

The outsole 4 of this embodiment is formed of a polymer crosslinked product.

The polymer crosslinked product is obtained by crosslinking a polymer composition containing a rubber, a thermoplastic resin and a crosslinking agent.

That is, the polymer crosslinked product forming the outsole 4 of this embodiment includes one or more of a product in which rubber molecules are crosslinked with each other, a product in which thermoplastic resin molecules are crosslinked with each other, and a product in which rubber molecules and thermoplastic resin molecules are crosslinked.

The polymer crosslinked product forming the outsole 4 has a JIS A hardness of 90 or less and a tear strength of 40 kgf/cm or more, and has a relationship of the expression (1) below between a storage modulus ($E_{23}$) at 23° C. and 10 Hz and a storage modulus ($E_{160}$) at 160° C. and 10 Hz:

$$3 \leq [(E_{23})/(E_{160})] \leq 40 \tag{1}$$

Hereinafter, the abovementioned ratio "($E_{23}$)/($E_{160}$)" may be referred to, for example, as "elastic modulus ratio".

The storage modulus ($E_{23}$) of the polymer crosslinked product at 23° C. and 10 Hz is preferably 3 MPa or more and 100 MPa or less.

The storage modulus ($E_{23}$) of the polymer crosslinked product at 23° C. and 10 Hz is more preferably 4 MPa or more and 90 MPa or less, particularly preferably 5 MPa or more and 80 MPa or less.

The storage modulus ($E_{160}$) of the polymer crosslinked product at 160° C. and 10 Hz is preferably 1 MPa or more and 10 MPa or less.

The storage modulus ($E_{160}$) of the polymer crosslinked product at 160° C. and 10 Hz is more preferably 2 MPa or more and 9 MPa or less, particularly preferably 3 MPa or more and 8 MPa or less.

The JIS A hardness of the polymer crosslinked product is preferably 85 or less, more preferably 80 or less.

The JIS A hardness of the polymer crosslinked product is preferably 40 or more, more preferably 50 or more.

The tear strength of the crosslinked polymer is preferably 40 kgf/cm or more, more preferably 50 kgf/cm or more, particularly preferably 60 kgf/cm or more.

It is not necessary to particularly determine the upper limit of the tear strength of the polymer crosslinked product, but it is usually 150 kgf/cm or less.

In order to allow the shoe to exert an excellent lightweight property, the density of the polymer crosslinked product is preferably 1.05 g/cm$^3$ or less, more preferably 1.0 g/cm$^3$ or less, particularly preferably 0.9 g/cm$^3$ or less.

It is not necessary to particularly determine the lower limit of the density of the polymer crosslinked product, but it is usually 0.85 g/cm$^3$ or more.

It is preferable that the polymer crosslinked product be an unfoamed body.

More specifically, it is preferable that the polymer crosslinked product contain no bubbles except for those unintendedly contained therein.

The volume ratio of air in the polymer crosslinked product forming the outsole 4 is preferably 5% by volume or less, more preferably 2% by volume or less, particularly preferably 1% by volume or less.

The density of the abovementioned polymer crosslinked product herein means a density thereof in an unfoamed state.

The unfoamed polymer crosslinked product has an advantage of being excellent in dimensional stability of a molded product (i.e., outsole) as well as simplifying its fabricating process since the necessity to mix a foaming agent or immerse foaming gas is eliminated during the fabrication.

The storage modulus of the polymer crosslinked product can be calculated, for example, by collecting a strip-shaped sample from the outsole and measuring a dynamic viscoelasticity according to JIS K 7244-4 using the sample as a test piece under the following conditions.

(Measurement Conditions of Storage Modulus)
Measuring instrument: Dynamic viscoelasticity measurement instrument Rheogel-E4000 manufactured by UBM.
Shape of sample: Strip, length of 33±3 mm, width of 5±0.3 mm, thickness of 2±0.3 mm.
Measurement mode: Tensile mode of a sinusoidal strain.
Distance between chucks: 20±0.2 mm.
Temperatures: 23° C. and 160° C.
Frequency: 10 Hz.
Load: Automatic static load.
Dynamic strain: 5 μm.

The tear strength of the polymer crosslinked product can be measured, for example, according to JIS K 6252 under the following conditions by collecting a sample from the outsole and using the sample as a test piece.
(Measurement Conditions of Tear Strength)
Measuring instrument: Product name "STROGRAPH-R2" manufactured by Toyo Seiki Seisaku-sho, Ltd.
Shape of sample: Angle type test piece (unnicked) specified in JIS K 6252 Test speed: 500 mm/min The JIS A hardness of the polymer crosslinked product can be measured, for example, according to JIS K 6253 under the following conditions by collecting a sample from the outsole and using the sample as a test piece.
(Measurement Conditions of JIS A Hardness)
Measuring instrument: Spring type hardness tester A
Test piece thickness: 12 mm or more
Load value: 9.81 N
Reading: Instantaneous value The density of the polymer crosslinked product can be measured according to JIS K 7112 by collecting a sample from the outsole and using the sample as a test piece, and can be measured, for example, by the underwater substitution method of the same standard.

In the case where it is difficult to directly collect the abovementioned sample for measuring the abovementioned characteristic values from the outsole, the measurement can be performed using a polymer crosslinked product fabricated from a polymer composition having the same constituents as those of the polymer composition forming the outsole.

In the polymer composition of this embodiment, in the case where the thermoplastic resin is a crystalline resin, the crystal of the thermoplastic resin functions as a reinforcement of rubber.

Further, in the polymer composition of this embodiment, even in the case where the thermoplastic resin is an amorphous resin, an area in which an intermolecular force acts relatively strongly (e.g., a phase in the glassy state and a hard segment), if any, can be caused to function as a reinforcement of rubber.

Thus, the polymer composition can form a polymer crosslinked product having excellent strength while decreasing use of an inorganic reinforcing material, which has a larger density than that of a rubber, such as silica or carbon black conventionally used as a reinforcement of rubber.

Whether the thermoplastic resin is a crystalline resin or an amorphous resin can be determined by performing the differential scanning calorimetric analysis (DSC), depending on whether an endothermic peak associated with melting of the crystal or an exothermic peak associated with crystallization at the time of cooling the molten crystal is observed.

It is preferable that the abovementioned thermoplastic resin contained in the abovementioned polymer crosslinked product be one or more selected from the group consisting of a crystalline resin whose melting point (Tm) satisfies the condition of the expression (2) below and an amorphous resin whose glass transition temperature (Tg) satisfies the condition of the expression (3) below:

$$60° C. \leq Tm \leq 160° C. \quad (2)$$

$$60° C. \leq Tg \leq 160° C. \quad (3)$$

In the case where a plurality of melting points and glass transition temperatures are observed in the DSC, a melting point and a glass transition temperature appearing on the highest temperature side are defined as Tm and Tg, respectively.

The abovementioned melting point (Tm) and glass transition temperature (Tg) are more preferably 70° C. or more, further preferably 75° C. or more.

The abovementioned melting point (Tm) and glass transition temperature (Tg) are more preferably 150° C. or less, further preferably 140° C. or less.

The melting point (Tm) and glass transition temperature (Tg) of the thermoplastic resin can be calculated according to JIS K 7121, and can be calculated by the differential scanning calorimetric analysis (DSC).

The melting point (Tm) is an endothermic peak temperature at the second scan in the differential scanning calorimetric analysis.

The glass transition temperature (Tg) is a midpoint glass transition temperature of the same standard.

The differential scanning calorimetric analysis (DSC) can be performed, for example, with the sample amount being approximately 5 mg under the condition of a heating rate of 10° C./min.

When the polymer composition as above is crosslinked to form a polymer crosslinked product, such a polymer crosslinked product shows a positive correlation between the elastic modulus ratio $[(E_{23})/(E_{160})]$ and a mechanical strength such as a tear strength.

That is, the polymer crosslinked product shows a tendency that a value of tear strength or the like becomes large as the elastic modulus ratio becomes high.

The polymer crosslinked product shows a positive correlation also between the elastic modulus ratio $[(E_{23})/(E_{160})]$ and a JIS A hardness or the like.

That is, the polymer crosslinked product shows a tendency that a hardness value becomes large with increase in the elastic modulus ratio.

The storage modulus of the polymer crosslinked product is usually lower at a high temperature than that at an ordinary temperature.

At this time, the degree of decrease in the storage modulus in the rubber part of the polymer crosslinked product is lower than the degree of decrease in the thermoplastic resin part.

Changing behavior of the storage modulus associated with temperature rise of the polymer crosslinked product usually varies by the type of the polymer.

In the case of a rubber alone, of which elasticity is mainly derived from entropy elasticity, the storage modulus theoretically increases with the temperature change from an ordinary temperature to a high temperature. Thus, the rubber does not produce the abovementioned effect.

In the case of a thermoplastic resin, of which elasticity development is contributed not only by entropy elasticity but also greatly by energy elasticity, the storage modulus decreases as crystal fusion, glass transition, or the like occurs in the temperature change from an ordinary temperature to a high temperature. Thus, the thermoplastic resin contained in the polymer crosslinked product produces the abovementioned effect.

In other words, the degree of decrease in the storage modulus of the polymer crosslinked product associated with the temperature change from an ordinary temperature to a high temperature expresses to what degree a component having a strong intermolecular force in the thermoplastic resin is contained in the polymer crosslinked product.

That is, the degree of decrease in the storage modulus expresses the degree of the reinforcing effect of the thermoplastic resin.

Accordingly, it is important that the elastic modulus ratio of the polymer crosslinked product is not less than the lower limit (3) in order to allow the polymer crosslinked product to exert excellent strength.

It is important that the elastic modulus ratio of the polymer crosslinked product is not more than the upper limit (40) in order to allow the polymer crosslinked product to exert excellent flexibility.

In these regards, the elastic modulus ratio is preferably 4 or more and 35 or less, particularly preferably 5 or more and 30 or less.

In order to more reliably enable the polymer crosslinked product to exert the above properties, the proportion of the thermoplastic resin to the total of the rubber and the thermoplastic resin in the polymer composition is preferably 15% by mass or more, more preferably 20% by mass or more.

That is, when the proportion of the thermoplastic resin is 15% by mass or more, an effect is produced that the reinforcing effect of the thermoplastic resin is expressed more effectively.

The proportion of the thermoplastic resin to the total of the rubber and the thermoplastic resin in the polymer composition is preferably 80% by mass or less, more preferably 75% by mass or less.

That is, when the proportion of the thermoplastic resin is 80% by mass or less, an effect is produced that kneading processability is improved (i.e., kneading is made easy) in the fabrication of the polymer composition.

As the rubber contained in the polymer composition that is a material of the polymer crosslinked product, one or two or more selected from the group consisting of, for example, natural rubber (NR), isoprene rubber (IR), butadiene rubber (BR), styrene-butadiene rubber (SBR), isobutylene-isoprene rubber (IIR), chloroprene rubber (CR), acrylonitrile butadiene rubber (NBR), ethylene propylene rubber (EPR), and ethylene propylene diene rubber (EPDM) can be employed.

Among these, it is preferable to employ one or more selected from the group consisting of natural rubber, isoprene rubber, butadiene rubber, and styrene-butadiene rubber, as a rubber in this embodiment.

It is preferable that the rubber have a density of 1.0 g/cm$^3$ or less.

Natural rubber is suitable as a component of the polymer composition since it is excellent in strength at a low density.

Natural rubber may be epoxidized or modified otherwise.

The other rubbers than natural rubber can also be used as a source of the outsole after being modified in various ways.

As the thermoplastic resin contained in the polymer composition together with the rubber, one or two or more crystalline resins selected from the group consisting of, for example, polyethylene resin (PE), polypropylene resin (PP), ethylene-vinyl acetate copolymer resin (EVA), ethylene-methyl acrylate copolymer resin (EMA), ethylene-ethyl acrylate copolymer resin (EEA), ethylene-methyl methacrylate copolymer resin (EMMA), polyamide resin (PA), a crystalline polyester resin, and 1,2-butadiene resin (PBD) can be employed.

As the thermoplastic resin, one or two or more amorphous resins selected from the group consisting, for example, of styrene-based resins such as styrene homopolymer (GPPS), high impact polystyrene resin (HIPS) containing a rubber component, poly-α-methylstyrene, acrylonitrile-styrene copolymer resin (AS), and acrylonitrile-butadiene-styrene copolymer resin (ABS); an acrylic resin; an amorphous polyester; polycarbonate resin (PC); and polyvinyl chloride resin (PVC) can be employed.

Further, as the thermoplastic resin, one or two or more thermoplastic elastomers selected from the group consisting of, for example, an olefin-based thermoplastic elastomer (TPO), a styrene-based thermoplastic elastomer (TPS), an amide-based thermoplastic elastomer (TPA), a urethane-based thermoplastic elastomer (TPU), and an ester-based thermoplastic elastomer (TPC) can be employed.

Among the abovementioned thermoplastic resins, polyethylene resin (PE), which contains a large number of crystals, is suitable as a material for forming the polymer crosslinked product.

As the polyethylene resin (PE) to be employed as a material for forming the polymer crosslinked product, one or two or more selected from the group consisting, for example, of the polyethylene resin that contains ethylene and a slight amount of α-olefin, such as high density polyethylene (HDPE) having a density of 0.94 g/cm$^3$ or more and less than 0.97 g/cm$^3$, medium density polyethylene (MDPE) having a density of 0.925 g/cm$^3$ or more and less than 0.94 g/cm$^3$, and linear low density polyethylene (LLDPE) having a density of less than 0.925 g/cm$^3$; and polyethylene that is substantially a polymer of ethylene only, such as a polyethylene having a density of 0.91 g/cm$^3$ or more and less than 0.95 g/cm$^3$ and very low density polyethylene (VLDPE) having a density of less than 0.9 g/cm$^3$ can be employed.

Among these, it is particularly preferable that a polyethylene resin (PE) used as a material for forming the polymer crosslinked product be linear low density polyethylene (LLDPE) in view of the reinforcing effect and weight saving effect on the polymer crosslinked product.

Linear low density polyethylene (LLDPE) contains a large number of small crystals, and thus has a high reinforcing effect on the polymer crosslinked product.

It is preferable that linear low density polyethylene (LLDPE) be a polymerized product by a single site catalyst such as a metallocene catalyst.

It is preferable that linear low density polyethylene (LLDPE) have the content of such comonomer as 1-butene, 1-hexene, and 1-octene being 0.5 mol % to 15 mol %.

In the polymer composition for forming the polymer crosslinked product, crosslinking agents for a rubber and a thermoplastic resin can be further contained.

Sulfur or the like is suitable as the crosslinking agent for the rubber.

An organic peroxide is preferable as the crosslinking agent for the thermoplastic resin.

Thus, it is preferable to use both a sulfur-based crosslinking agent and a peroxide crosslinking agent in the polymer composition.

A vulcanization accelerator, a crosslinking aid, or the like may be contained in the polymer composition.

In the polymer composition, a crosslinking agent may be generally contained in the ratio of 1 mass part or more and 10 mass parts or less relative to 100 mass parts of the total of the rubber and the thermoplastic resin.

Examples of the abovementioned sulfur-based crosslinking agent include sulfur and a sulfur compound.

As the sulfur, one or two or more selected from the group consisting of, for example, powder sulfur, precipitated sulfur, colloidal sulfur, surface-treated sulfur, and insoluble sulfur can be employed.

As the sulfur compound, one or two or more selected from the group consisting of, for example, sulfur chloride, sulfur dichloride, morpholine disulfide, alkylphenol disulfide, and polymeric polysulfide can be employed.

As the vulcanization accelerator, one or two or more selected from the group consisting of, for example, an aldehyde-ammonia-based vulcanization accelerator, an aldehyde-amine-based vulcanization accelerator, a thiourea-based vulcanization accelerator, a guanidine-based vulcanization accelerator, a thiazole-based vulcanization accelerator, sulfenamide-based vulcanization accelerator, a dithiocarbamate-based vulcanization accelerator, and a xanthate-based vulcanization accelerator can be employed.

As the organic peroxide, one or two or more selected from the group consisting of, for example, dicumyl peroxide, di-t-butyl peroxide, 2,5-dimethyl-2,5-di-(t-butylperoxy) hexane, 2,5-dimethyl-2,5-di-(t-butylperoxy)hexane-3, 1,3-bis(t-butylperoxyisopropyl)benzene, 1,1-bis(t-butylperoxy)-3,3,5-trimethylcyclohexane, n-butyl-4,4-bis(t-butylperoxy) valerate, benzoyl peroxide, p-chlorobenzoyl peroxide, 2,4-dichlorobenzoyl peroxide, t-butyl peroxybenzoate, t-butylperoxyisopropyl carbonate, diacetyl peroxide, lauroyl peroxide, and t-butylcumyl peroxide can be employed.

As the crosslinking aid, one or two or more selected from the group consisting of, for example, divinylbenzene, trimethylolpropane trimethacrylate, 1,6-hexanediol methacrylate, 1,9-nonanediol dimethacrylate, 1,10-decanediol dimethacrylate, triallyl trimellitate ester, triallyl isocyanate, neopentylglycol dimethacrylate, triallyl 1,2,4-benzenetricarboxylate ester, tricyclodecane dimethacrylate, and polyethyleneglycol diacrylate can be employed.

In the polymer composition, additives may be further contained, such as a scorch retarder, a peptizer, a slipping agent, a mold releasing agent, a lubricant, an aging retardant, an antioxidant, a weather-proof agent, a flame retarder, a pigment, an electrostatic preventing agent, an antimicrobial agent, a deodorizer, a silane coupling agent, and a tackifier.

If necessary, an inorganic filler such as silica may be contained as another additive in the polymer composition.

However, the proportion of these additives to the polymer composition is preferably 10% by mass or less in total, more preferably 7% by mass or less.

The polymer composition of this embodiment can be fabricated using a common kneading apparatus such as a Banbury mixer, a kneader, a twin-screw extruder, and an open roll.

It is preferable that the polymer composition be used for forming an outsole after the polymer composition is once processed into an uncrosslinked sheet by a calender roll or the like.

The outsole can be fabricated by a method such as hot pressing of the uncrosslinked sheet mentioned above.

More specifically, the outsole can be fabricated by hot pressing using a mold in which an internal space corresponding to the shape of the outsole is formed at the time of closing the mold.

The upper material 2 and the midsole 3 used in addition to the outsole for forming the shoe 1 of this embodiment can be those conventionally known.

The outsole of this embodiment is excellent in the lightweight property and also excellent in mechanical strength.

Therefore, the shoe of this embodiment is also excellent in the lightweight property.

The outsole and shoe according to the present invention is not limited to the abovementioned embodiment, but various modifications can be made without departing from the gist of the present invention.

EXAMPLES

Next, the present invention will be described in more detail by way of Examples, without limitation thereto.

Examples 1 and 2, Comparative Examples 1 to 7

Polymer crosslinked products containing the components shown in the Table 1 below were fabricated, and a density, a JIS A hardness and a tear strength of the crosslinked products were measured.

The results are shown together in Table 1.

TABLE 1

| | Density [g/cm3] | Tm [° C.] | Comparative Example 1 | Comparative Example 2 | Comparative Example 3 | Comparative Example 4 | Comparative Example 5 | Comparative Example 6 | Comparative Example 7 | Example 1 | Example 2 |
|---|---|---|---|---|---|---|---|---|---|---|---|
| Natural rubber | 0.91 | — | | | | | | | | 65 | 65 |
| Isoprene rubber | 0.92 | — | 100 | 100 | 100 | | | | | | |
| Butadiene rubber | 0.90 | — | | | | 100 | 100 | 100 | 100 | | |
| LLDPE (1) | 0.89 | 66 | | | | | | | | 35 | |
| LLDPE (2) | 0.91 | 94 | | | | | | | | | 35 |
| Silica | — | — | 0 | 10 | 20 | 0 | 10 | 20 | 45 | 0 | 0 |
| Crosslinking agent | — | — | 2 | 2 | 2 | 2 | 2 | 2 | 2 | 4 | 4 |
| Additive | — | — | 14 | 14 | 14 | 14 | 14 | 14 | 14 | 6 | 6 |
| Total | | | 116 | 126 | 136 | 116 | 126 | 136 | 161 | 110 | 110 |
| Density [g/cm³] | | | 0.94 | 0.98 | 1.02 | 0.94 | 0.98 | 1.02 | 1.09 | 0.99 | 0.96 |
| Hardness | | | 34 | 40 | 47 | 45 | 47 | 53 | 60 | 64 | 71 |
| Tear strength [kgf/cm] | | | 27 | 31 | 54 | 5 | 11 | 26 | 38 | 52 | 59 |

Figure 2:
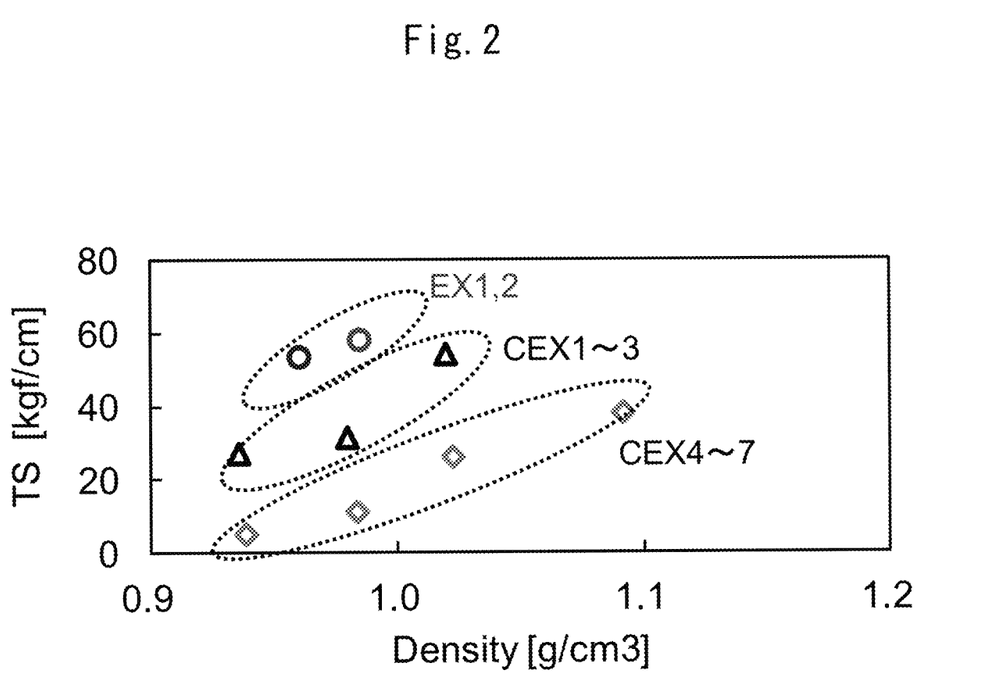
FIG. 2 is a graph showing the relationships between a density and a tear strength, of polymer crosslinked products fabricated in Examples.

FIG. 2 is a graph showing the relationships between the density and the tear strength based on the abovementioned results.

As shown in FIG. 2, Examples 1 and 2 (circular legends: EX1, EX2) achieve both the lightweight property and high strength.

However, Comparative Examples 1 to 3 (triangular legends: CEX1, CEX2, CEX3) in which isoprene rubber and silica are combined, and Comparative Examples 4 to 7 (rhombic legends: CEX4, CEX5, CEX6, CEX7) in which butadiene rubber and silica are combined fail to achieve both the lightweight property and high strength.

The polymer crosslinked products of Examples 1 and 2 satisfy all the following Condition 1 to Condition 3.

On the other hand, the polymer crosslinked products of Comparative Examples 1 to 7, except for Comparative Example 3, do not satisfy Condition 2 and Condition 3, and Comparative Example 3 does not satisfy Condition 3, either.

Condition 1: JIS A hardness of 90 or less
Condition 2: Tear strength of 40 kgf/cm or more
Condition 3: $3 \leq [(E_{23})/(E_{160})] \leq 40$ (where "$E_{23}$" is a storage modulus at 23° C. and 10 Hz, and "$E_{160}$" is a storage modulus at 160° C. and 10 Hz.)

(Additional Test)

The polymer crosslinked products containing three LLDPEs (LL-A, LL-B, and LL-C), a styrene-based thermoplastic elastomer (TPS), natural rubber (NR), and butadiene rubber (BR) were fabricated respectively at the ratios shown in Table 2 below, and the JIS A hardness, the tear strength, the storage modulus ($E_{23}$) at 23° C. and 10 Hz, and the storage modulus ($E_{160}$) at 160° C. and 10 Hz, of the crosslinked products were measured.

The melting points (Tm) of the three LLDPEs (LL-A, LL-B, and LL-C) and the glass transition temperature (Tg) of the styrene-based thermoplastic elastomer (TPS) were each measured.

TABLE 2

| Materials | Density [g/cm3] | Tm, Tg [° C.] | NR&LL-A | NR&LL-B | NR&LL-C | NR&TPS | BR&LL-A |
|---|---|---|---|---|---|---|---|
| LL-A | 0.92 | Tm: 118 | Variable | — | — | — | Variable |
| LL-B | 0.89 | Tm: 77 | — | 35 | — | — | — |
| LL-C | 0.89 | Tm: 66 | — | — | Variable | — | — |
| TPS | 0.96 | Tg: 70 | — | 65 | — | 35 | — |
| NR | 0.91 | — | Variable | — | Variable | 65 | — |
| BR | 0.90 | — | — | — | — | — | Variable |
| Peroxide crosslinking agent | — | — | | | 5.0 | | |
| Sulfur/Vulcanization accelerator | — | — | | | 3.0 | | |
| Other agents | — | — | | | 5.2 | | |

Figure 3:
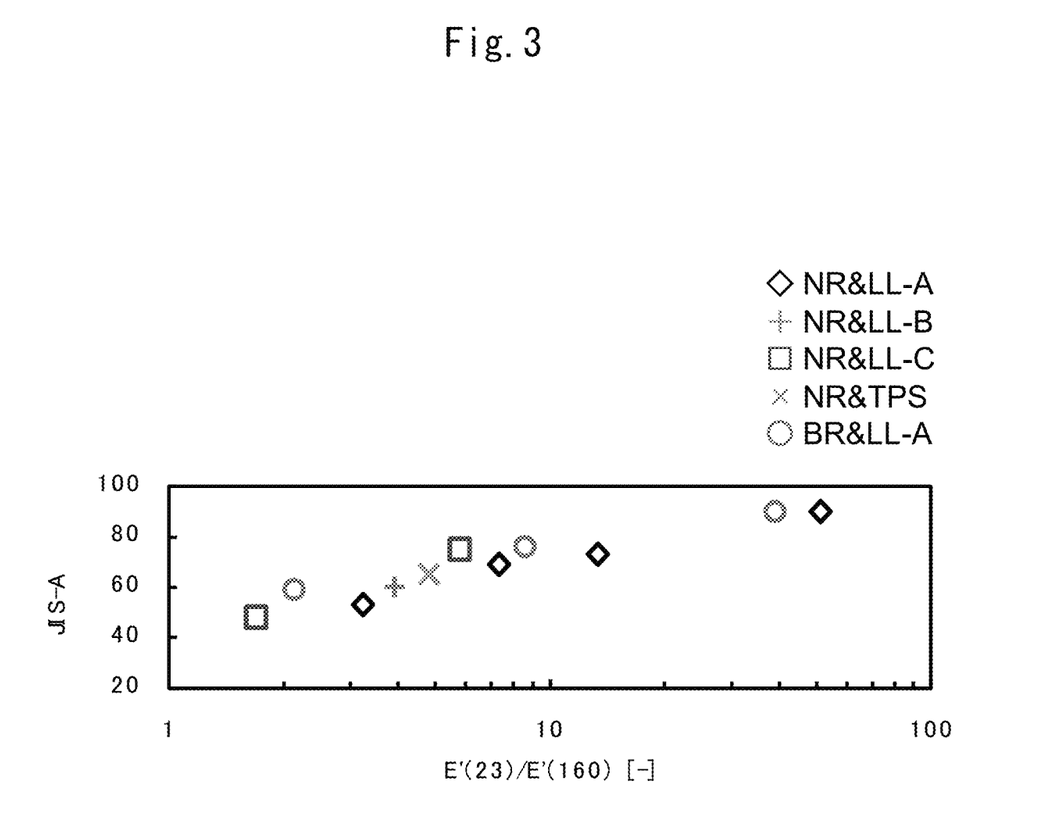
FIG. 3 is a graph showing the relationship between a JIS A hardness and a ratio [($E_{23}$)/($E_{160}$)] of the storage modulus ($E_{23}$) at 23° C. and 10 Hz relative to the storage modulus ($E_{160}$) at 160° C. and 10 Hz, of the polymer crosslinked products fabricated in Examples.
Figure 4:
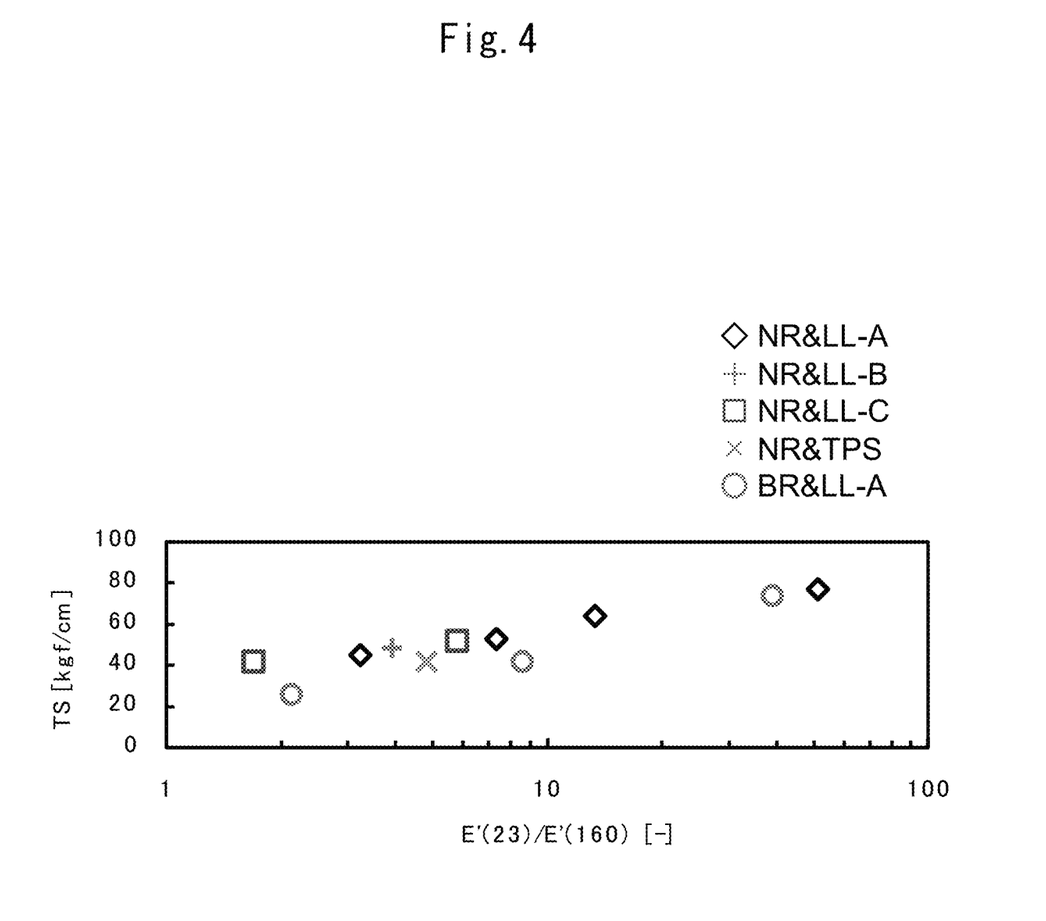
FIG. 4 is a graph showing the relationship between the tear strength and the ratio [($E_{23}$)/($E_{160}$)] of the storage modulus ($E_{23}$) at 23° C. and 10 Hz relative to the storage modulus ($E_{160}$) at 160° C. and 10 Hz, of the polymer crosslinked products fabricated in Examples.

FIG. 3 and FIG. 4 respectively show the relationships between the JIS A hardness and the ratio [$(E_{23})/(E_{160})$] of the storage modulus ($E_{23}$) at 23° C. and 10 Hz relative to the storage modulus ($E_{160}$) at 160° C. and 10 Hz, of the polymer crosslinked products containing the components shown in Table 2, and the relationships between the abovementioned ratio and the tear strength of the same.

As is evident from FIGS. 3 and 4, a polymer crosslinked product excellent in strength and flexibility can be obtained without use of an inorganic filler when the ratio [$(E_{23})/(E_{160})$] of the storage modulus ($E_{23}$) at 23° C. and 10 Hz relative to the storage modulus ($E_{160}$) at 160° C. and 10 Hz falls within a proper range.

It is evident from the aforementioned description that, according to the present invention, an outsole effective for forming a shoe excellent in the lightweight property is provided.

REFERENCE SIGNS LIST

1: Shoe
2: Upper material
3: Midsole
4: Outsole

The invention claimed is:

1. An outsole formed of a polymer crosslinked product, wherein the polymer crosslinked product comprises a rubber and a thermoplastic resin;
the rubber comprises one or more selected from a group consisting of natural rubber, isoprene rubber, butadiene rubber, and styrene-butadiene rubber;
the thermoplastic resin comprises one or more selected from a group consisting of linear low density polyethylene and a styrene-based thermoplastic elastomer;
the polymer crosslinked product has a hardness of 90 or less as measured according to JIS K 6253 using a spring type hardness tester A, and a tear strength of 40 kgf/cm or more; and
the polymer crosslinked product has a relationship of the expression (1) below between a storage modulus ($E_{23}$) at 23° C. and 10 Hz and a storage modulus ($E_{160}$) at 160° C. and 10 Hz:

$$3 \leq [(E_{23})/(E_{160})] \leq 40 \tag{1}$$

2. The outsole according to claim 1, wherein a density of the polymer crosslinked product is 1.0 g/cm³ or less.

3. The outsole according to claim 1, wherein the polymer crosslinked product contains, as the thermoplastic resin, one or two or more selected from the group consisting of: a crystalline resin whose melting point (Tm) satisfies a condition of the expression (2) below; and an amorphous resin whose glass transition temperature (Tg) satisfies a condition of the expression (3) below:

$$60° C. \leq Tm \leq 160° C. \tag{2}$$

$$60° C. \leq Tg \leq 160° C. \tag{3}$$

4. The outsole according to claim 1, wherein the polymer crosslinked product contains, as the rubber, one or two or more selected from the group consisting of natural rubber, isoprene rubber, butadiene rubber, and styrene-butadiene rubber.

5. A shoe comprising the outsole according to claim 1.

6. The outsole according to claim 1, wherein the rubber has a density of 1.0 g/cm³ or less.

7. The outsole according to claim 1, further comprising an inorganic filler, wherein a content of the inorganic filler is 10 mass % or less based on mass of the polymer crosslinked product.

* * * * *